April 26, 1938.  R. M. JONES  2,115,267
ELECTRIC TOASTER CONSTRUCTION
Filed Jan. 12, 1937
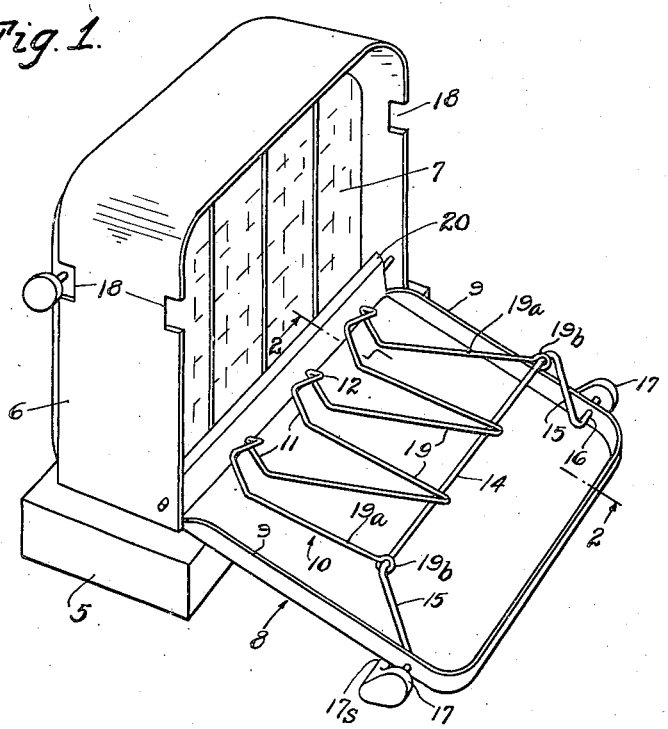
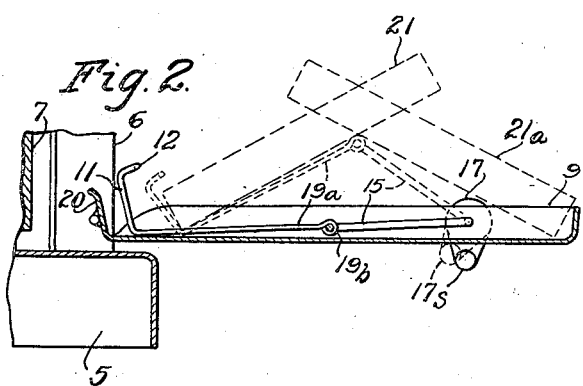
INVENTOR
Rodney M. Jones
BY Robt. W. Pearson
ATTORNEY Patented Apr. 26, 1938

2,115,267

UNITED STATES PATENT OFFICE 2,115,267

ELECTRIC TOASTER CONSTRUCTION

Rodney M. Jones, Los Angeles, Calif.

Application January 12, 1937, Serial No. 120,263

6 Claims. (Cl. 53—5)

This invention relates to an electric toaster construction and pertains to an improved mechanism adapted for toasting a slice of bread and for mechanically handling the slice in such a manner that, after toasting, it can be conveniently grasped by the fingers of the user without danger of his or her hand becoming burned by contact with any heated portion of the toaster. The invention may be embodied either in a reconstructed toasting device, or in toasters now on the market when combined with an improved slice-handling attachment which is provided by the invention.

The invention, more specifically defined, includes means for mechanically tilting a toasted slice of bread to such a position, in relation to a heated part of a toaster which supports it, that said slice may be grasped at its edge by the fingers of the operator without the fingers being brought into contact with said heated part.

One of the objects of the invention is to provide for toasters now on the market, an attachment which may be added to such toasters with but a slight alteration in the construction of such toasters, and which after being applied will safeguard the fingers of the user from being burned, in the manner already stated.

Other objects, advantages and features of the invention may hereinafter appear.

Referring to the accompanying drawing, which illustrates what is at present deemed to be a preferred embodiment of the invention, Fig. 1 is a perspective view of a toaster embodying the invention.

Fig. 2 is a sectional view of the toaster shutter taken on line 2—2 of Fig. 1; different positions of a toasted slice of bread being indicated by broken lines.

Referring in detail to the drawing, the toaster shown comprises the foot portion 5, upstanding sheet metal frame 6 and upstanding electric heating element 7 guarded by said frame.

The toaster is designed to have a shutter or slice support 8 pivotally connected with the lower portion of the device at each side thereof, one of which is shown in the drawing. Said slice supports are, by preference and as shown, made of sheet metal and are furnished along each side edge with an inwardly directed flange 9.

The invention pertains more particularly to a slice handling means including an apron 10 which is shown made of wire but which may, if desired, consist of sheet metal. At one edge said apron has a slice-supporting foot portion 11 which terminates in reversely directed toe portions 12; and at its opposite edge said apron is pivotally connected with a manually operable tilting member 14. Said member 14 is shown as a bell crank shaped wire having at each end a radial arm 15 which is furnished with outwardly directed end portions 16 that are pivotally mounted in the flanges 9 and are operable as a rock shaft. To each of said end portions 16 is fixed a finger hold or knob 17 for manually tilting the apron 10. Notches 18 in the frame 6 accommodate said knobs when the side plate 8 is swung upwardly.

In the drawing the pivoted shutter 8 is shown having an inwardly directed horizontal base flange 20 that would support the slice of bread 21 during toasting were it not for the fact that the foot portion 11 of the apron 10 performs this function after said apron has been attached to the toaster. Hence the flange can be dispensed with in newly made toasters when such toasters are equipped with said apron.

In a toaster having the frame 6 and side plates 8 shown in the drawing no alteration is necessary except to provide the pivot holes for the shaft ends 16 and to cut the notches 18 to accommodate the knobs or finger-holds 17 when the side plate 8 is up. The wire apron 10 is shown as consisting of a single wire which includes the reversely bent wire runs 19 forming V-shaped elements having the foot portions 11 and toes 12 at one end. The opposite ends of the wire runs 19 are bent to acute angles and rest loosely upon the wire 14, while the outer runs 19a have eyes 19b in their ends which pivotally receive the wire 14 of the tilting member.

In the operation of the device the slice of bread to be toasted is placed upon the apron 10 while said apron is in the recumbent position shown in Fig. 2 and the shutter or hinged side plate 8 of the toaster, together with said apron, is swung to the upstanding position and is allowed to remain in that position until the bread has become toasted. Thereupon the operator grasps one of the knobs 17 and swings said side plate down to its horizontal position, at the same time using said knob to tilt the apron 10 up to the position shown in broken lines in Fig. 2. If the side plate 8 has been swung down gently, the toasted slice will occupy the position indicated by 21, but if said side plate is suddenly thrown down the slice may slide outwardly and then be tilted as indicated at 21a. The side plate 8 may still be used as heretofore to reverse the position of a half-toasted slice and present the untoasted side thereof to the heating element.

The fingerholds 17 are furnished with stop shoulders 17s which cooperate with adjacent portions of the shutter plates 8 to limit the extent to which the apron 10 can be tilted.

I claim:

1. In a toaster construction, a frame, an upstanding heat-radiating toasting element mounted on said frame, a slice-supporting element pivotally mounted adjacent said toasting element and swingable outwardly therefrom to convey the slice from an upstanding to a recumbent position, and manually operable slice-tilting means mounted upon said slice supporting element to raise an edge portion of the recumbent slice out of contact with said slice supporting element, said manually operable means including finger-holds mounted upon said slice-supporting element in a pivotal relation thereto.

2. In a toaster construction, a frame, an upstanding heat-radiating toasting element mounted on said frame, a slice-supporting element pivotally mounted adjacent said toasting element and swingable outwardly therefrom to convey the slice from an upstanding to a recumbent position, an apron carried by said slice supporting element and positioned to underlie the slice when the latter is in a recumbent position, and a manually rockable shaft mounted upon said element, said shaft having an offset portion pivotally connected with said apron to tilt it up from a flatwise contacting position in relation to said element.

3. The subject matter of claim 2 and, said element having flanges upon which said shaft is journaled and said shaft having a fingerhold located externally of one of said flanges.

4. The subject matter of claim 2 and, said apron consisting of a wire having reversely bent portions.

5. In a device of the kind described, a toaster frame, an upstanding toasting element mounted thereon, a shutter pivotally connected with the lower portion of said frame to swing to and from an upstanding position adjacent to said toasting element, a slice support carried by said shutter and arranged to support the slice both when said shutter is in its up and its down position, and means mounted on said shutter to tilt said slice support and the slice carried thereby when said shutter is in its down position, said means being pivotally connected with both said slice support and said shutter.

6. In a device of the kind described, a toaster frame, an upstanding toasting element mounted thereon, a shutter pivotally connected with the lower portion of said frame to swing to and from an upstanding position adjacent to said toasting element, a slice support carried by said shutter and arranged to support the slice both when said shutter is in its up and its down position, and means mounted on said shutter to tilt said slice support and the slice carried thereby when said shutter is in its down position, said slice tilting means including a wire shaped to function as a crank and pivotally connected with said slice support and said shutter.

RODNEY M. JONES.